US012615658B2

(12) United States Patent
Xing

(10) Patent No.: US 12,615,658 B2
(45) Date of Patent: Apr. 28, 2026

(54) FREQUENCY BAND CONFIGURATION METHOD, TERMINAL DEVICE, NETWORK DEVICE, CHIP AND STORAGE MEDIUM

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 390 days.

(21) Appl. No.: 18/227,246

(22) Filed: Jul. 27, 2023

(65) Prior Publication Data

US 2023/0371056 A1 Nov. 16, 2023

Related U.S. Application Data

(63) Continuation of application No. PCT/CN2021/085143, filed on Apr. 1, 2021.

(51) Int. Cl.
*H04W 72/541* (2023.01)
*H04W 72/0453* (2023.01)

(52) U.S. Cl.
CPC ..... *H04W 72/541* (2023.01); *H04W 72/0453* (2013.01)

(58) Field of Classification Search
CPC ........... H04W 72/541; H04W 72/0453; H04W 72/21; H04W 24/10; H04W 76/15; H04W 52/365; H04W 52/367; H04W 52/146; H04W 52/54
See application file for complete search history.

(56) References Cited

U.S. PATENT DOCUMENTS

| | | | |
|---|---|---|---|
| 10,999,827 B2 | 5/2021 | Takahashi | |
| 11,363,536 B2 * | 6/2022 | Zacharias | ......... H04W 72/1215 |
| 11,509,350 B2 * | 11/2022 | Pezeshki | .............. H04B 1/7143 |
| 12,095,534 B2 * | 9/2024 | Huang | .................. H04W 72/23 |
| 2008/0273606 A1 | 11/2008 | Orfanos | |
| 2020/0205146 A1 | 6/2020 | Takahashi | |
| 2020/0275503 A1 | 8/2020 | Yang | |
| 2020/0350937 A1 | 11/2020 | Hong | |

(Continued)

FOREIGN PATENT DOCUMENTS

| | | |
|---|---|---|
| CN | 109451825 A | 3/2019 |
| CN | 109842943 A | 6/2019 |

(Continued)

OTHER PUBLICATIONS

Supplementary European Search Report in the European application No. 21934049.4, mailed on Apr. 4, 2024, 8 pages.

(Continued)

*Primary Examiner* — Brian T O Connor
(74) *Attorney, Agent, or Firm* — BAYES PLLC

(57) ABSTRACT

A method for frequency band configuration comprises: a terminal device sending first indication information to a network device, wherein the first indication information is used for indicating interference information of a first frequency band combination, the interference information being used for indicating the network device to perform a configuration operation for the first frequency band combination.

17 Claims, 5 Drawing Sheets

(56) References Cited

U.S. PATENT DOCUMENTS

| | | | | |
|---|---|---|---|---|
| 2021/0050879 A1* | 2/2021 | Pezeshki | ............... | H04L 5/0094 |
| 2021/0051676 A1* | 2/2021 | Pezeshki | ............ | H04W 72/542 |
| 2021/0120501 A1* | 4/2021 | Zacharias | ........... | H04W 52/365 |
| 2022/0247468 A1* | 8/2022 | Huang | ................. | H04W 24/10 |

FOREIGN PATENT DOCUMENTS

| | | |
|---|---|---|
| CN | 110741666 A | 1/2020 |
| WO | 2019071573 A1 | 4/2019 |

OTHER PUBLICATIONS

International Search Report in the international application No. PCT/CN2021/085143, mailed on Dec. 3, 2021. 5 pages with English translation.
English translation of the Written Opinion of the International Search Authority in the international application No. PCT/CN2021/085143, mailed on Dec. 3, 2021. 8 pages with English translation.
Intel Corporation. "Clarification on BCS Reporting and Support for Intra-band EN-DC Band Combinations", 3GPP TSG-RAN WG2 Meeting #113-e Electronic meeting, R2-2100388, Jan. 15, 2021 (Jan. 15, 2021), full text. 4 pages.
"3rd Generation Partnership Project; Technical Specification Group Radio Access Network; NR; User Equipment (UE) radio transmission and reception; Part 1: Range 1 Standalone (Release 15)", 3GPP TS 38.101-1 v15.11.0 (Sep. 2020). 239 pages.
3rd Generation Partnership Project; Technical Specification Group Radio Access Network, "NR; User Equipment (UE) radio transmission and reception; Part 3: Range 1 and Range 2 Interworking operation with other radios (Release 15)",3GPP TS 38.101-3 v15.11.0 (Sep. 2020). 179 pages.

\* cited by examiner

—S710

A terminal device sends first indication information to a network device, the first indication information being configured to indicate interference information of a first frequency band combination, and the interference information being configured to indicate the network device to perform a configuration operation for the first frequency band combination

A network device receives first indication information from a terminal device, the first indication information being configured to indicate interference information of a first frequency band combination

—S820

The network device performs a configuration operation for the first frequency band combination according to the interference information

FIG. 8

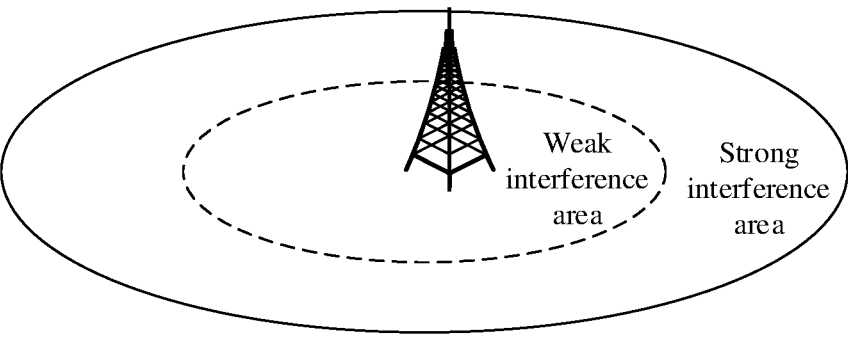

Weak interference area

Strong interference area

FIG. 9

FREQUENCY BAND CONFIGURATION METHOD, TERMINAL DEVICE, NETWORK DEVICE, CHIP AND STORAGE MEDIUM

CROSS-REFERENCE TO RELATED APPLICATION

This application is a continuation of International Application No. PCT/CN2021/085143 filed on Apr. 1, 2021, the disclosure of which is hereby incorporated by reference in its entirety.

BACKGROUND

Due to factors such as interference or noise, a receiver of a terminal device may have a certain sensitivity degradation. In a New Radio (NR) system, there are many reasons for the sensitivity degradation of the receiver. Typically, the sensitivity degradation is caused by harmonic or intermodulation interference in some frequency band combinations. Usually, the size of interference depends on the design of the terminal device, and the suppression of the interference by different terminal devices is very different. Therefore, the communication system cannot effectively utilize the frequency band combinations with the interference.

SUMMARY

The present disclosure relates to the field of communication. Embodiments of the present disclosure provide a method for frequency band configuration, a terminal device, a network device, a chip, a computer-readable storage medium, a computer program product, a computer program and a communication system, which may configure frequency band combinations in a communication system.

The embodiments of the present disclosure provide a method for frequency band configuration, which may include the following operation.

A terminal device sends first indication information to a network device.

The first indication information may be configured to indicate interference information of a first frequency band combination, and the interference information may be configured to indicate the network device to perform a configuration operation for the first frequency band combination.

The embodiments of the present disclosure provide a method for frequency band configuration, which may include the following operations.

A network device receives first indication information from a terminal device.

The first indication information is used to indicate interference information of a first frequency band combination.

The network device performs a configuration operation for the first frequency band combination according to the interference information.

The embodiments of the present disclosure also provide a terminal device, which may include a first communication module.

The first communication module may be configured to send first indication information to a network device.

The first indication information may be configured to indicate interference information of a first frequency band combination, and the interference information may be configured to indicate the network device to perform a configuration operation for the first frequency band combination.

The embodiments of the present disclosure also provide a network device, which may include a second communication module and a second processing module.

The second communication module may be configured to receive first indication information from a terminal device. The first indication information is used to indicate interference information of a first frequency band combination.

The second processing module may be configured to perform a configuration operation for the first frequency band combination according to the interference information.

The embodiments of the present disclosure also provide a terminal device, which may include a processor and a memory. The memory may be configured to store a computer program, and the processor may call and run the computer program stored in the memory to execute the above method for frequency band configuration.

The embodiments of the present disclosure also provide a network device, which may include a processor and a memory. The memory may be configured to store a computer program, and the processor may call and run the computer program stored in the memory to execute the above method for frequency band configuration.

The embodiments of the present disclosure also provide a chip, which may include a processor. The processor may be configured to call and run a computer program from a memory, to enable a device installed with the chip to execute the above method for frequency band configuration.

The embodiments of the present disclosure also provide a computer-readable storage medium, configured to store a computer program. The computer program may enable a computer to execute the above method for frequency band configuration.

The embodiments of the present disclosure also provide a computer program product, which may include a computer program instruction. The computer program instruction may enable a computer to execute the above method for frequency band configuration.

The embodiments of the present disclosure also provide a computer program. The computer program may enable a computer to execute the above method for frequency band configuration.

The embodiments of the present disclosure also provide a communication system, which may include a terminal device and a network device configured to execute the above method for frequency band configuration.

According to the embodiments of the present disclosure, the terminal device reports the interference information of the first frequency band combination by sending the first indication information, and the network device may obtain the interference information of the terminal device, and perform the configuration operation according to the interference information of the terminal device. Therefore, the configuration of the frequency band combination by the network device may be consistent with the actual interference level of the terminal device, so as to effectively utilize each frequency band combination.

BRIEF DESCRIPTION OF THE DRAWINGS

FIG. 7 is a schematic flowchart of a method for frequency band configuration according to an embodiment of the present disclosure.

FIG. 8 is schematic flowchart of a method for frequency band configuration according to another embodiment of the present disclosure.

FIG. 9 is a schematic diagram of interference area types according to an embodiment of the present disclosure.

DETAILED DESCRIPTION

Figure 1:
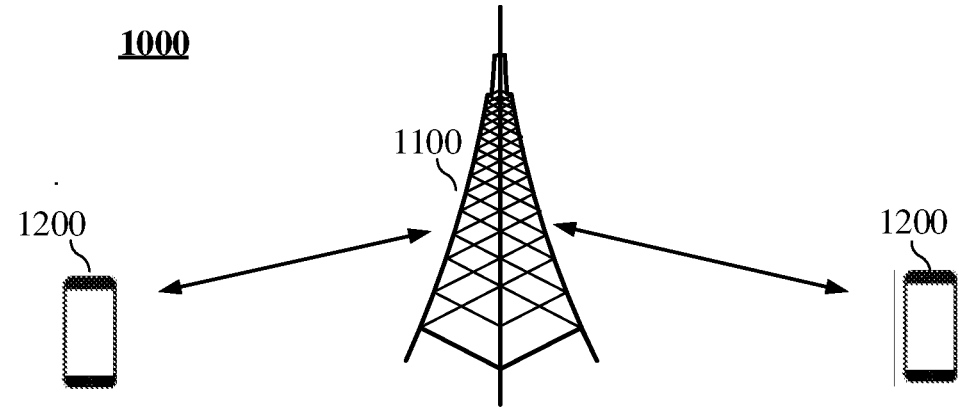
FIG. 1 is a schematic diagram of a communication system architecture according to an embodiment of the present disclosure.

The technical solutions in the embodiments of the present disclosure will be described below in combination with the drawings in the embodiments of the present disclosure.

The technical solutions of the embodiments of the present disclosure may be applied to various communication systems, for example: a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an NR system, an evolved system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), a Wireless Local Area Network (WLAN), Wireless Fidelity (WiFi), a 5th-Generation (5G) system, or another communication system.

Generally, connections supported by a conventional communication system are usually limited in number and also easy to implement. However, with the development of communication technologies, a mobile communication system will not only support conventional communication but also support, for example, Device to Device (D2D) communication, Machine to Machine (M2M) communication, Machine Type Communication (MTC), Vehicle to Vehicle (V2V) communication, or Vehicle to everything (V2X)

communication. The embodiments of the present disclosure may also be applied to these communication systems.

In an embodiment, a communication system in the embodiments of the present disclosure may be applied to a Carrier Aggregation (CA) scenario, or a Dual Connectivity (DC) scenario, or a Standalone (SA) network deployment scenario.

Each of the embodiments of the present disclosure is described in combination with a network device and a terminal device. The terminal device may also be referred to as User Equipment (UE), an access terminal, a user unit, a user station (ST), a mobile ST, a mobile radio ST, a remote ST, a remote terminal, a mobile device, a user terminal, a terminal, a wireless communication device, a user agent, a user device, etc.

The terminal device may be an ST in the WLAN, or may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle-mounted device, a wearable device, a terminal device in a next-generation communication system, for example, an NR network, a terminal device in a future evolved Public Land Mobile Network (PLMN), or the like.

In the embodiments of the present disclosure, the terminal device may be deployed on land, including indoor or outdoor, handheld, wearable or onboard, or may be deployed on the water surface (such as a ship), or may be deployed in the air (such as an airplane, a balloon or a satellite).

In the embodiments of the present disclosure, the terminal device may be a Mobile Phone, a Pad, a computer with a wireless transceiving function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example rather than restriction, in the embodiments of the present disclosure, the terminal device may also be a wearable device. The wearable device, also referred to as a wearable intelligent device, is a generic term of wearable devices obtained by performing intelligent design and development on daily wearing products by using the wearable technology, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include full-featured, large size and complete or partial functions realized without relying on smart phones, such as smart watches or smart glasses, and includes only a certain application function, which is necessary to be used in conjunction with other devices such as a smart phone, such as various smart bracelets for monitoring physical signs, or smart jewelry and the like.

In the embodiments of the present disclosure, the network device may be a device configured to communicate with a mobile device. The network device may be an Access Point (AP) in the WLAN, a Base Transceiver Station (BTS) in the GSM or CDMA, or may be a NodeB (NB) in WCDMA, or may be an Evolutional Node B (eNB or eNodeB) in LTE, or a relay ST or AP, or a vehicle-mounted device, a wearable device, a network device (a gNB) in the NR network, a network device in the future evolved PLMN, or the like.

As an example rather than restriction, in the embodiments of the present disclosure, the network device may have mobile characteristics. For example, the network device may be a mobile device. In an embodiment, the network device may be a satellite or a balloon ST. For example, a satellite may be a Low Earth Orbit (LEO) satellite, a Medium Earth Orbit (MEO) satellite, a Geosynchronous Earth Orbit (GEO) satellite, a High Elliptical Orbit (HEO) satellite, etc. In an embodiment, the network device may also be a base ST arranged in land, water or another place.

In the embodiments of the present disclosure, the network device may provide service for a cell, and the terminal device communicates with the network device through a transmission resource (for example, a frequency-domain resource or a spectrum resource) for the cell. The cell may be a cell corresponding to the network device (for example, a base ST). The cell may belong to a macro base ST or a base ST corresponding to a small cell. Here, the small cell may include: a metro cell, a micro cell, a pico cell, a femto cell and the like. These small cells have the characteristics of small coverage and low transmitted power and are suitable for providing high-rate data transmission services.

FIG. 1 exemplarily illustrates a network device 1100 and two terminal devices 1200. In an embodiment, a communication system 1000 may include multiple network devices and another number of terminal devices may be included in coverage of each network device 1100, which is not limited in the embodiment of the present disclosure. In an embodiment, the wireless communication system 1000 illustrated in FIG. 1 may further include other network entities such as a Mobility Management Entity (MME), and an Access and Mobility Management Function (AMF). No limits are made thereto in the embodiments of the present disclosure.

It is to be understood that a device with a communication function in the network/system in the embodiments of the present disclosure may be called a communication device. Taking the communication system illustrated in FIG. 1 as an example, the communication device may include the network device and the terminal device with the communication function, and the network device and the terminal device may be the specific devices in the embodiments of the present disclosure and will not be elaborated herein. The communication device may further include other devices in the communication system, for example, other network entities such as a network controller and an MME. No limits are made thereto in the embodiments of the present disclosure.

It is to be understood that terms "system" and "network" may usually be exchanged herein. The term "and/or" is only an association relationship describing associated objects, for example, represents that previous and next associated objects may have three relationships. For example, A and/or B may represent three conditions: i.e., independent existence of A, existence of both A and B, and independent existence of B. The character "/" in the disclosure usually represents that previous and next associated objects form an "or" relationship.

It is to be understood that the term "indication" mentioned in the embodiments of the present disclosure may be direct indication, or indirect indication, or indicate that there is an association relationship. For example, A indicating B may indicate that A directly indicates B, for example, B may be acquired through A, or indicate that A indirectly indicates B, for example, A indicates C, and B may be acquired through C, or indicate that there is an association relationship between A and B.

In the description of the embodiments of the present disclosure, the term "correspondence" may indicate that there is a direct correspondence or indirect correspondence between the two elements, or may indicate that there is an association relationship between the two elements, or may indicate a relationship between indicating and being indicated, or between configuring and being configured.

In order to facilitate the understanding of the technical solutions in the embodiments of the present disclosure, the related technologies of the embodiments of the present disclosure are described below. The following related technologies may be arbitrarily combined with the technical solutions in the embodiments of the present disclosure as optional solutions, and all of them belong to the scope of protection of the embodiments of the present disclosure.

In NR, there are actually a large number of frequency band combinations, including inter-band CA, DC, and LTE (E) and NR (N) DC, such as EN-DC or NE-DC. Taking EN-DC as an example, a process of the sensitivity degradation of the terminal device working in the frequency band combination due to harmonic interference or intermodulation interference is described below.

Usually, the interference in the terminal device mainly results from the nonlinearity of radio frequency front-end devices such as a Power Amplifier (PA). Specifically, when the input is a single-tone signal cos (wt), an output signal contains high-order harmonic components such as 2 wt and 3 wt, where w represents the frequency and t represents the time. If the harmonic falls into a receiving frequency band, it may cause the harmonic interference. The interference mostly occurs in scenarios where low-frequency transmission and high-frequency reception are performed simultaneously.

When the input signal contains multiple frequency components, the output contains intermodulation products of each order of these frequency components. Taking two input frequency components cos $(w_1t)$ and cos $(w_2t)$ as an example, the output may contain intermodulation products such as second-order intermodulation $(w_1 \pm w_2)$ and third-order intermodulation $(2w_1 \pm w_2, w_1 \pm 2w_2)$. If the intermodulation product falls into the receiving frequency band, it may cause the intermodulation interference. Such interference generally occurs in high and low frequency simultaneous transmission scenarios, in scenarios where external signals are inverted into a transmission link of the UE, etc.

Figure 2:
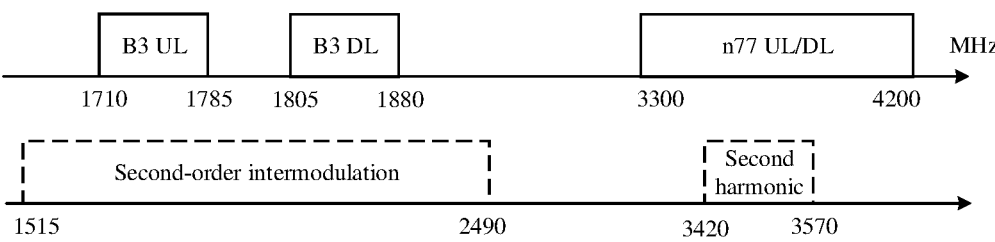
FIG. 2 is a schematic diagram of harmonic interference and intermodulation interference according to an embodiment of the present disclosure.

FIG. 2 illustrates a schematic diagram of harmonic interference and intermodulation interference by taking the interference of an EN-DC combination LTE B3+NR n77 as an example. The terminal device transmits in a frequency band B3 and receives in a frequency band n77. As illustrated in FIG. 2, on the one hand, the second harmonic of a low-band B3 Uplink (UL) may cause the interference to a high-band n77 Downlink (DL), resulting in the deterioration of the receiving sensitivity of the high-band n77. On the other hand, a second-order intermodulation product between the B3 UL and an n77 UL may fall into the B3 DL receiving frequency range, which causes intermodulation interference to the B3 DL reception.

In NR, the harmonic interference and the intermodulation interference have a serious impact on the receiving performance of the terminal device. Especially, the influence degree of the second harmonic and the second-order intermodulation product is more likely to reach tens of dB of the sensitivity deterioration. As a result, the DL receiving coverage of the terminal device is greatly reduced.

Figure 3:
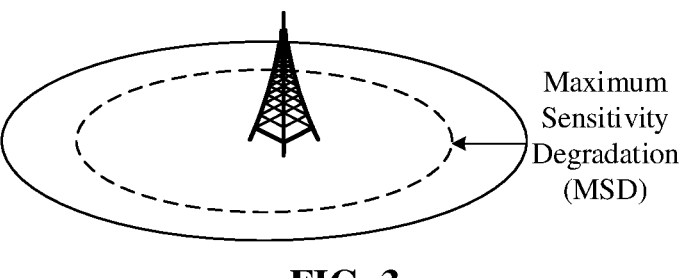
FIG. 3 is a schematic diagram of Maximum Sensitivity Degradation (MSD) according to an embodiment of the present disclosure.

As illustrated in FIG. 3, in the related standards, a sensitivity degradation parameter is usually defined to be compatible with different interferences. The sensitivity degradation parameter, namely MSD, represents an allowable degradation value of the DL reception capability of the terminal for the frequency band combination with the interference.

Figure 4:
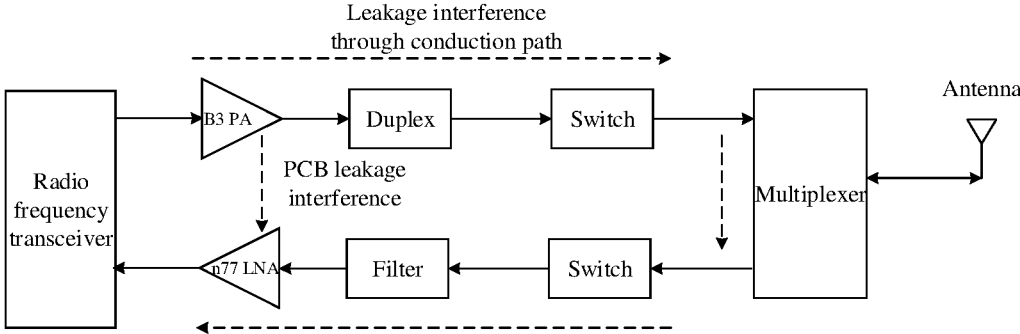
FIG. 4 is a schematic diagram of an interference generation path according to an embodiment of the present disclosure.

FIG. 4 illustrates a schematic diagram of an interference generation path in the terminal device. As illustrated in FIG. 4, a transmission link of the terminal device includes devices such as a PA, a duplex and a switch, and a receiving link includes devices such as a switch, a filter and a Low Noise Amplifier (LNA). The harmonic interference and the intermodulation interference not only include interference generated by the reverse coupling of the transmission link and the receiving link, namely leakage interference through a conduction path, but also include interference leaked from a Printed Circuit Board (PCB) of the terminal device into another link, namely PCB leakage interference. As illustrated in FIG. 4, the second harmonic generated by the B3 transmission link of the terminal device interferes with the 3.5 GHz reception of the n77 band through the conduction path as well as a PCB leakage path.

For the leakage interference through the conduction path, the measures usually taken include that: a filter is added to a radio frequency path to suppress the harmonic interference and the intermodulation interference, a better PA is selected to reduce the generation of nonlinear interference signals, or the like. For the PCB leakage interference, the interference may be reduced by increasing the degree of isolation in the PCB layout design. However, these measures usually depend on the structural design of the terminal device. The suppression of the interference by different terminal devices is very different.

In addition, through the in-depth research, the inventor found that the size of interference of the terminal device or the degree to which the terminal device is affected by the interference is also related to the actual situation of the terminal device in a network. There are mainly the following related factors.

Figure 5:
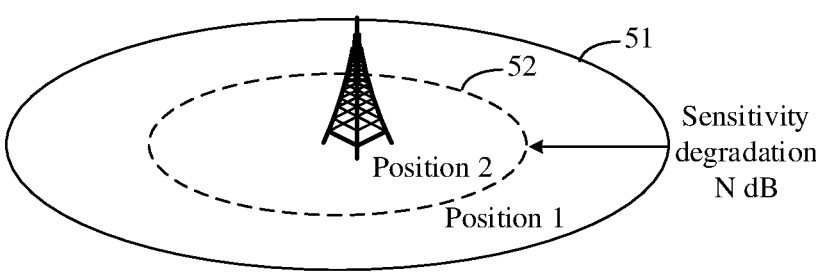
FIG. 5 is a schematic diagram of receiving coverage before and after sensitivity degradation according to an embodiment of the present disclosure.

Position factor: FIG. 5 illustrates a schematic diagram of receiving coverage before and after sensitivity degradation of the terminal device. When the terminal operates in the single band LTE B3, the DL receiving coverage of the terminal is within a peripheral solid line 51. When the network is configured with a secondary component carrier NR n77 to form the EN-DC combination LTE B3+NR n77, the receiving sensitivity of B3 may be degraded by N dB due to the intermodulation interference, and the DL receiving coverage of the terminal may shrink to be within a dotted line 52. In such case, if the terminal device is in a position 1, the terminal device may not maintain a link connection of B3, resulting in disconnection. If the terminal device is in a position 2, the terminal device may still maintain the link connection although the reception capability is poor. Therefore, for the same deteriorated N dB, whether the terminal device may maintain the connection is related to the position of the terminal device in the network. From another point of view, the position factor may be regarded as related to the strength of a received signal. That is, for the same interference intensity, the influence on the link is small when the DL available signal is strong, and the influence on the link is large when the DL available signal is weak.

Transmitted power factor: the interference size of the terminal device is actually affected by the transmitted power.

For example, the intensity of the harmonic interference is related to the strength of a low frequency signal. The larger the transmitted power, the greater the interference, on the contrary, the smaller the transmitted power, the smaller the interference. The intensity of the intermodulation interference is related to the strength of multiple concurrent signals, and the greater the power of the concurrent signals, the greater the intermodulation interference.

Figure 6:
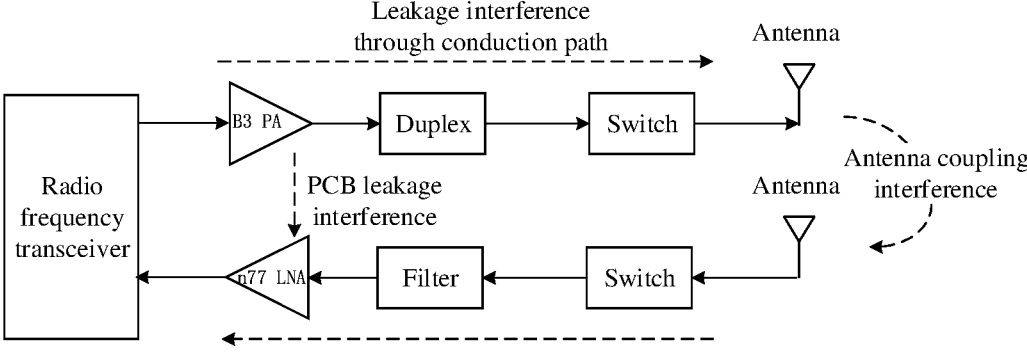
FIG. 6 is a schematic diagram of antenna coupling interference according to an embodiment of the present disclosure.

Application scenario factor: as illustrated in FIG. 6, in addition to the leakage interference through the conduction path as well as the PCB leakage interference, inter-antenna coupling also causes the interference. When there is human contact (such as holding), the antenna coupling interference may be amplified or reduced, resulting in an increase or decrease in sensitivity deterioration. In the actual network, it is difficult for the network device to determine the interference size on the terminal device in antenna coupling and human contact scenarios.

As mentioned above, for the frequency band combination that generates the interference, the MSD is defined by the related standards, which allows a certain sensitivity degradation of the terminal. As long as a sensitivity deterioration value of the terminal device is less than the MSD, it is considered that the communication requirements are met. However, the MSD of some frequency band combinations is large, for example, for the frequency band combination B3+n77 illustrated in FIG. 2, when the second harmonic interference or the second-order intermodulation interference occurs, the MSD usually reaches 20 dB or even more. Even if the terminal device meets an MSD index, the frequency band combination may not be effectively utilized in the existing network. Since the suppression of the interference by terminal devices is significantly different, and the degree to which each terminal device is affected by the interference is also affected by the actual situation of the terminal device in the network, the network device may not determine the actual sensitivity degradation of the terminal device, and may only infer the interference situation of the terminal device in the cell under the frequency band combination according to the MSD. In some scenarios, if the interference is considered to be too serious/large, the network device may not use the frequency band combination at all. As a result, the frequency band combination with the interference may not be effectively utilized.

The solutions provided in the embodiments of the present disclosure are mainly used to solve at least one of the above problems.

In order to provide a more detailed understanding of the features and technical contents of the embodiments of the present disclosure, the implementation of the embodiments of the present disclosure will be described in detail below with reference to the drawings, and the drawings are for illustration only and are not intended to limit the embodiments of the present disclosure.

FIG. 7 is a schematic flowchart of a method for frequency band configuration according to an embodiment of the present disclosure. The method may be applied to a terminal device in a system as illustrated in FIG. 1, but is not limited thereto. The method includes the following operation.

At S710, the terminal device sends first indication information to a network device.

The first indication information may be configured to indicate interference information of a first frequency band combination, and the interference information may be configured to indicate the network device to perform a configuration operation for the first frequency band combination.

Exemplarily, the first indication information may include at least one of Radio Resource Control (RRC) signaling, Media Access Control (MAC) Control Element (CE), physical layer signaling or the like. The first frequency band combination may include frequency band combinations in CA, EN-DC, NE-DC, DC and other operating modes. The interference information may include an interference value, an interference state, etc.

In an embodiment, the configuration operation for the first frequency band combination may include that: it is determined whether to configure the first frequency band combination for the terminal device. That is, the interference information may indicate whether to configure the first frequency band combination for the terminal device.

The network device may determine to configure or not configure a frequency band combination for the terminal device. In some scenarios, the frequency band combination may be configured/not configured in an activation manner, for example, multiple frequency band combinations are predefined, and at least some of the multiple frequency band combinations may be configured/not configured by activating/deactivating at least some of the multiple frequency band combinations. Based on this, in some scenarios, configuring/not configuring the frequency band combination may also be referred to as activating/deactivating the frequency band combination. Herein, the frequency band combination may also be referred to as a subcarrier. Based on this, configuring/not configuring the frequency band combination may also be referred to as configuring/not configuring the subcarrier and activating/deactivating the subcarrier. For example, in CA, ED-DC, NE-DC, DC and other operating modes, configuring the frequency band combination may be considered as configuring or activating the secondary component carrier, and not configuring the frequency band combination may be considered as not configuring or deactivating the secondary component carrier.

In an embodiment, the configuration operation for the first frequency band combination may include that: in a case of configuring the first frequency band combination for the terminal device, it is determined whether to perform scheduling based on certain time-frequency resources under the first frequency band combination. The scheduling may include scheduling the terminal device for UL transmission or DL reception, etc.

Exemplarily, the interference information of the first frequency band combination may have a correspondence with a certain interference type such as a first interference type. For example, the interference information of the first frequency band combination is an interference value or interference state of the first interference type corresponding to the first frequency band combination. Here, the interference value may refer to the size of the interference size such as the size of sensitivity deterioration. The interference state may include high interference, low interference, etc. Correspondingly, the configuration operation for the first frequency band combination may include that: in a case of configuring the first frequency band combination for the terminal device, it is determined whether to perform scheduling based on the time-frequency resource(s) corresponding to the first interference type under the first frequency band combination. That is, in a case of configuring the first frequency band combination for the terminal device, the interference information may indicate whether to perform scheduling based on the time-frequency resource corresponding to the first interference type under the first frequency band combination.

For example, in a case that the first frequency band combination is B3+n77, if the first interference type is harmonic interference, and the time-frequency resources corresponding to the harmonic interference under the first frequency band combination are DL time-frequency resources of band n77 which are affected by high order harmonic interference, then according to the interference information of the harmonic interference of B3+n77 in the first indication information, it may be determined whether the scheduling is performed based on the DL time-frequency resources of band n77.

According to the embodiments of the present disclosure, the terminal device reports the interference information of the first frequency band combination by sending the first indication information, and the network device may obtain the interference information of the terminal device, and execute the configuration operation according to the interference information of the terminal device. Therefore, the configuration of the frequency band combination by the network device may be consistent with the actual interference situation of the terminal device, so as to effectively utilize each frequency band combination.

Correspondingly, the embodiments of the present disclosure also provide a method for frequency band configuration. The method may be applied to a network device in a system as illustrated in FIG. 1, but is not limited thereto. As illustrated in FIG. 8, the method may include the following operations.

At S810, the network device receives first indication information from a terminal device. The first indication information is used to indicate interference information of a first frequency band combination.

At S820, the network device performs a configuration operation for the first frequency band combination according to the interference information.

In an embodiment, the operation that the network device performs the configuration operation for the first frequency band combination according to the interference information in S820 includes the following operation.

The network device determines whether to configure the first frequency band combination for the terminal device according to the interference information.

In an embodiment, the interference information has a correspondence with a first interference type. Correspondingly, the operation that the network device performs the configuration operation for the first frequency band combination according to the interference information includes the following operation.

In a case of configuring the first frequency band combination for the terminal device, the network device determines, according to the interference information, whether to perform scheduling based on a time-frequency resource corresponding to the first interference type under the first frequency band combination.

It is to be noted that these optional methods may be implemented individually or in combination with each other. For example, the interference information of the first frequency band combination may include multiple interference values or interference states corresponding to multiple interference types respectively. The network device may determine whether to configure the first frequency band combination for the terminal device according to the overall situation of multiple interference values or interference states. In a case of configuring the first frequency band combination, it is determined according to the interference value or interference state of a specific interference type whether to perform scheduling based on the time-frequency resource corresponding to the interference type under the first frequency band combination. For example, the interference information of the first frequency band combination includes an interference state of harmonic interference and an interference state of intermodulation interference. If the harmonic interference and the intermodulation interference are high interference, the first frequency band combination is not configured for the terminal device. If the harmonic interference is high interference and the intermodulation interference is low interference, the first frequency band combination is configured for the terminal device, the scheduling on the time-frequency resource corresponding to the harmonic interference is avoided, and the scheduling may be performed on the time-frequency resource corresponding to the intermodulation interference.

In an embodiment, after the network device determines whether to configure or not configure the first frequency band combination, the network device may configure/not configure the first frequency band combination by sending second indication information. Exemplarily, the method for frequency band configuration further includes that: the network device sends the second indication information to the terminal device. The second indication information is used to indicate the frequency band combination configured for the terminal device. For example, the second indication information may include RRC reconfiguration information that contains an identifier of the frequency band combination configured for the terminal device. For example, the second indication information may include an MAC CE used to activate or deactivate the frequency band combination.

In the embodiments of the present disclosure, the first indication information may be implemented in various ways.

In an embodiment, the first indication information may explicitly report or directly indicate the interference situation of the terminal device. For example, there are two exemplary implementation modes.

Mode 1: the first indication information is configured to indicate a first interference value corresponding to the first frequency band combination, i.e., the specific interference size, such as a sensitivity deterioration value or a sensitivity degradation value. That is, the interference information includes the first interference value corresponding to the first frequency band combination.

The first interference value may be an interference value generated when the terminal device operates in the first frequency band combination. The first interference value may be one of a set of optional values. For example, the set of optional values is {3 dB, 6 dB, 9 dB, 12 dB, 15 dB, 18 dB}, and the first interference value may be one of them, such as 3 dB or 6 dB, etc.

In an example, the terminal device may determine the first interference value based on the interference situation in the worst operating scenario. For example, the first interference value may be the interference value when the terminal device operates in the first frequency band combination and is located at the edge of a cell, with the maximum transmitted power and the minimum received signal. The terminal device may also determine the first interference value based on the real-time interference situation.

Mode 2: the first indication information is configured to indicate an interference state corresponding to the first interference value. That is, the interference information includes the interference state corresponding to the first interference value.

The terminal device may determine the interference state based on the first interference value. The interference state may include that: the first interference value is greater than a first preset value or the first interference value is less than a second preset value. Alternatively, the interference state may include high interference or low interference. If the first interference value is greater than or equal to the preset value, the interference state is high interference. If the first interference value is less than the preset value, the interference state is low interference. After determining the interference state, the terminal device reports the interference state as high interference or low interference through the first indication information.

In an embodiment, the first indication information is configured to indicate that the first interference value corresponding to the first frequency band combination is greater than the first preset value. For example, the system may default the interference state to low interference, and the terminal device may send the first indication information in a case of high interference. Specifically, the operation that the terminal device sends the first indication information to the network device in S710 includes that: in response to the first interference value being greater than the first preset value, the terminal device sends the first indication information, and the first indication information is configured to indicate the interference state of the first frequency band combination as high interference.

In an embodiment, the first indication information is configured to indicate that the first interference value corresponding to the first frequency band combination is less than the second preset value. For example, the system may default the interference state to high interference, and the terminal device may send the first indication information in a case of low interference. Specifically, the operation that the terminal device sends the first indication information to the network device in S710 includes that: in response to the first interference value being less than the second preset value, the terminal device sends the first indication information, and the first indication information is configured to indicate the interference state of the first frequency band combination as low interference.

In an embodiment, the terminal device may determine the interference state based on the interference situation in the worst operating scenario, and may also determine the interference state based on the real-time interference situation.

In practical applications, the above explicit reporting modes may also be combined with each other. For example, the interference information indicated by the first indication information includes both the first interference value and the corresponding interference state.

Based on the explicit reporting mode, the network device may determine the interference state, and perform the configuration operation for the first frequency band combination based on the interference state.

For example, the operation that the network device determines whether to configure the first frequency band combination for the terminal device according to the interference information may include the following operations.

In response to determining according to the interference information that the interference state corresponding to the first frequency band combination is high interference, the network device determines not to configure the first frequency band combination for the terminal device.

And/or, in response to determining according to the interference information that the interference state corresponding to the first frequency band combination is low interference, the network device determines to configure the first frequency band combination for the terminal device.

That is, the operation that the network device determines whether to configure the first frequency band combination for the terminal device according to the interference information may include that: in response to determining according to the interference information that the first interference value corresponding to the first frequency band combination is greater than the first preset value, the network device determines not to configure the first frequency band combination for the terminal device.

And/or, in response to determining according to the interference information that the first interference value corresponding to the first frequency band combination is less than the second preset value, the network device determines to configure the first frequency band combination for the terminal device.

For another example, the operation that the network device determines, according to the interference information, whether to perform scheduling based on the time-frequency resource corresponding to the first interference type under the first frequency band combination includes the following operations.

In response to determining according to the interference information that the interference state of the first interference type corresponding to the first frequency band combination is high interference, the network device determines not to perform scheduling based on the time-frequency resource corresponding to the first interference type under the first frequency band combination.

And/or, in response to determining according to the interference information that the interference state of the first interference type corresponding to the first frequency band combination is low interference, the network device determines to perform scheduling based on the time-frequency resource corresponding to the first interference type under the first frequency band combination.

That is, the operation that the network device determines, according to the interference information, whether to perform scheduling based on the time-frequency resource corresponding to the first interference type under the first frequency band combination includes the following operations.

In response to determining according to the interference information that the first interference value of the first interference type corresponding to the first frequency band combination is greater than the first preset value, the network device determines not to perform scheduling based on the time-frequency resource corresponding to the first interference type under the first frequency band combination.

And/or, in response to determining according to the interference information that the first interference value of the first interference type corresponding to the first frequency band combination is less than the second preset value, the network device determines to perform scheduling based on the time-frequency resource corresponding to the first interference type under the first frequency band combination.

In an embodiment, the first indication information may also implicitly report the interference situation of the terminal device. Here, implicit reporting refers to reflecting the current interference situation of the terminal device through indirect information. For example, there are two exemplary implementation modes.

Mode 3: the first indication information is configured to indicate an interference area type of an area where the terminal device is located. That is, the interference information further includes the interference area type of the area where the terminal device is located. Correspondingly, the method for frequency band configuration may further include the following operation. The terminal device determines the interference area type of the area where the terminal device is located based on DL signal strength corresponding to the first frequency band combination.

As mentioned above, when the terminal device is in different positions in the network, the degree to which the terminal device is affected by the interference is different. Based on this, the coverage of the network device may be divided into a strong interference area and a weak interference area. As illustrated in FIG. 9, the area close to the network device is the strong interference area, and the area far away from the network device is the weak interference area. The farther away from the network device, the higher transmitted power and the higher received signal strength are required. Therefore, a distance between the terminal device and the network device may be obtained based on the measurement of the DL signal strength, so as to determine whether the interference area type of the area where the terminal device is located is the strong interference area or the weak interference area.

Mode 4: the first indication information is configured to indicate a PHR corresponding to the first frequency band combination, and the PHR has a correspondence with the interference area type of the area where the terminal device is located. That is, the interference information includes the PHR. The PHR is a difference between the maximum configurable transmitted power of the terminal device and the current actual transmitted power, which is also an available PHR.

Generally, when the terminal device is in the strong interference area illustrated in FIG. 9, the transmitted power of the terminal device is large. Moreover, when the terminal device is in the weak interference area, the larger transmitted power may also increase the interference. Therefore, reporting the transmitted power as interference information may also help the network device to determine the current interference situation of the terminal device. When the PHR is lower than a certain value, the network device may consider the terminal to be in the strong interference area. When the PHR is higher than a certain value, the network device may consider the terminal to be in the weak interference area.

Based on the implicit reporting mode, the network device may determine the interference area type of the area where the terminal device is located, and perform the configuration operation for the first frequency band combination based on the interference area type.

Specifically, the operation that the network device determines whether to configure the first frequency band combination for the terminal device according to the interference information may include the following operations.

In response to determining based on the interference information that the area where the terminal device is located is the strong interference area, the network device determines not to configure the first frequency band combination for the terminal device.

And/or, in response to determining based on the interference information that the area where the terminal device is located is the weak interference area, the network device determines to configure the first frequency band combination for the terminal device.

When the terminal device reports the interference area type of the area where the terminal device is located, the terminal device may further report the corresponding interference type (such as harmonic interference or intermodulation interference, etc.) to the network device, and then the network device may further determine, according to the interference type corresponding to the interference information, whether to configure the corresponding frequency band combination for the terminal device and whether to perform scheduling based on the time-frequency resource(s) under the frequency band combination. For example, if the area where the terminal device is located is determined to be the strong interference area based on the interference information and the interference information corresponds to the first interference type, the terminal device avoids using a time-domain resource corresponding to the first interference type for scheduling, that is, the terminal device determines not to perform scheduling based on the time-domain resource corresponding to the first interference type under the first frequency band combination.

In practical applications, the explicit reporting mode and/or the implicit reporting mode may also be combined with each other. For example, the interference information indicated by the first indication information includes at least one of the following:

the first interference value corresponding to the first frequency band combination;

the interference state corresponding to the first interference value;

the interference area type of the area where the terminal device is located; or the PHR corresponding to the first frequency band combination.

In the embodiments of the present disclosure, the terminal device may send the first indication information in different scenarios or based on different trigger conditions, so as to achieve static or dynamic reporting of the interference situation. If the static reporting mode is used, the terminal device may determine and report various interference information based on the interference situation in the worst operating scenario. If the dynamic reporting mode is used, the terminal device may determine and report various interference information according to the real-time interference situation.

As an example of the static reporting of the interference situation, the operation that the terminal device sends the first indication information to the network device includes that: in a process of reporting terminal capability, the terminal device sends the first indication information to the network device.

In an embodiment, RRC signaling may be used to carry the interference information when the terminal capability is reported. That is, the first indication information may include first RRC signaling.

As an example of the dynamic reporting of the interference situation, the terminal device may report periodically, report based on an inquiry of the network device, or report when the interference state changes. Specifically, the operation that the terminal device sends the first indication information to the network device includes at least one of the following operations.

The terminal device periodically sends the first indication information to the network device.

In response to receiving first inquiry information sent by the network device, the terminal device sends the first indication information to the network device. The first inquiry information is configured to instruct the terminal device to report the interference information.

In a case that the interference state of the terminal device changes, the terminal device sends the first indication information to the network device.

Corresponding to the periodic reporting by the terminal device, the network device may periodically receive the first indication information and read the latest first indication information to determine the relevant configuration operation when the frequency band combination needs to be configured. Specifically, the operation that the network device receives the first indication information from the terminal device includes the following operation.

The network device receives the first indication information sent periodically by the terminal device.

Correspondingly, the operation that the network device performs the configuration operation for the first frequency band combination according to the interference information includes the following operation.

In a case of configuring the frequency band combination for the terminal device, the network device performs the configuration operation for the first frequency band combination according to the interference information indicated by the latest first indication information.

Corresponding to the reporting by the terminal device based on the inquiry of the network device, the operation that the network device receives the first indication information from the terminal device includes the following operations.

The network device sends the first inquiry information to the terminal device. The first inquiry information is configured to instruct the terminal device to report the interference information.

The network device receives the first indication information sent by the terminal device for the first inquiry information.

Exemplarily, the network device may send the first inquiry information to the terminal device when the frequency band combination needs to be configured, or may periodically send the first inquiry information to the terminal device. Specifically, the operation that the network device sends the first inquiry information to the terminal device includes the following operations.

In a case of configuring the frequency band combination for the terminal device, the network device sends the first inquiry information to the terminal device.

And/or, the network device periodically sends the first inquiry information to the terminal device.

In an embodiment, if the terminal device dynamically reports the interference information, the first indication information may include at least one of the following: second RRC signaling: an MAC CE: or physical layer signaling.

According to different application scenarios, one or more of the various exemplary implementation modes may be combined to meet different application requirements. Three specific application examples are respectively illustrated below.

Application Example 1

In this application example, the terminal device reports the interference situation statically. The method for frequency band configuration includes the following operations.

In 1, in the process of reporting terminal capability, the terminal device sends the first indication information to the network device. The first indication information is configured to indicate interference information of the first frequency band combination.

In 2, the network device receives the first indication information from the terminal device, and executes the configuration operation for the first frequency band combination according to the interference information indicated by the first indication information, such as determining to configure or not configure the first frequency band combination.

The interference information of the first frequency band combination includes the first interference value corresponding to the first frequency band combination or the interference state corresponding to the first interference value. The first interference value is determined based on the worst operating scenario of the terminal device.

For example, in a case of operating in the first frequency band combination, the terminal device determines an interference value when the transmitted power is maximum and the received signal is minimum as the first interference value. In the process of reporting the terminal capability, the terminal device determines the first indication information based on the first interference value and sends the first indication information.

Further, the interference information reported by the terminal device may have a correspondence with the interference type. For example, the terminal may report the interference state of the harmonic interference or the intermodulation interference.

In an exemplary implementation, the interference state of the terminal device defaults to low interference. In a case that the interference value of the first interference type is greater than the first preset value, the terminal device sends the first indication information, and the first indication information is configured to indicate that the interference state corresponding to the first interference type of the first frequency band combination is high interference. In a case of configuring the first frequency band combination for the terminal device, the network device does not perform scheduling based on the time-domain resource corresponding to the first interference type, so as to avoid the impact of the interference of the first interference type.

For example, when the terminal device operates in the B3+n77 frequency band combination, the harmonic interference and the intermodulation interference may be generated in theory. However, the terminal device has a strong ability to suppress the intermodulation interference, so that the actual intermodulation interference is not large, but the harmonic interference is large. The terminal device informs the network device through the first indication information that the harmonic interference is high interference, and the network device may pay attention to avoid the DL time-frequency resources of band n77 that receives the harmonic interference.

In an exemplary implementation, the interference state of the terminal device defaults to high interference. In a case that the interference value of the first interference type is less than the second preset value, the terminal device sends the first indication information, and the first indication information is configured to indicate that the interference state corresponding to the first interference type of the first frequency band combination is low interference. In a case of configuring the first frequency band combination for the terminal device, the network device may use the time-domain resource corresponding to the first interference type for scheduling.

This application example uses the static reporting mode, and the interference information reported is applicable to all scenarios of the terminal device in the network, which may reduce the frequent interaction between network device and terminal device and improve the system efficiency.

Application Example 2

In this application example, the terminal device reports the interference situation statically. The method for frequency band configuration includes the following operations.

In 1, the terminal device periodically sends the first indication information to the network device, and the first indication information is configured to indicate the current interference information of the first frequency band combination.

In 2, the network device receives the first indication information, and executes, in a case of configuring the frequency band combination for the terminal device, the configuration operation for the first frequency band combination according to the interference information indicated by the latest first indication information.

In 3, in a case that the interference state of the terminal device changes, the terminal device sends the first indication information to the network device, and the first indication information is configured to indicate the current interference information of the first frequency band combination.

That is, before the network device executes the corresponding configuration operation for the first frequency band combination, the terminal device periodically sends the first indication information. Specifically, the terminal device may periodically detect its own interference situation and report the interference information in real time. When the network device needs to configure the frequency band combination, the network device executes the corresponding configuration operation, such as configuring/not configuring the first frequency band combination. After the terminal device is configured or not configured with the first frequency band combination, if the interference state changes, the terminal device may send the first indication information to the network device again to adjust the configuration of the first frequency band combination.

In this application example, the interference information reported by the terminal device through the first indication information may include at least one of the following:

the first interference value corresponding to the first frequency band combination;

the interference state corresponding to the first interference value;

the interference area type of the area where the terminal device is located; or the PHR corresponding to the first frequency band combination.

That is, the terminal device may either use the explicit reporting mode or the implicit reporting mode. The terminal device may determine the interference information based on the real-time interference situation.

Further, the interference information reported by the terminal device may have a correspondence with the interference type. For example, the terminal device may report the interference state of the harmonic interference or the intermodulation interference. In a case of configuring the first frequency band combination, the network device may determine according to the interference information whether to schedule the time-frequency resource(s) corresponding to the interference type under the first frequency band combination.

This application example uses the dynamic reporting mode, which may accurately implement the configuration operation consistent with the actual interference situation in a case that the interference situation of the terminal device is affected by different positions, transmitted power, usage scenarios and other factors.

Application Example 3

In this application example, the terminal device reports the interference situation statically. The method for frequency band configuration includes the following operations.

In 1, in a case of configuring the frequency band combination for the terminal device, the network device sends the first inquiry information to the network device. The first inquiry information is configured to instruct the terminal device to report the interference information.

In 2, in a case of receiving the first inquiry information sent by the network device, the terminal device sends the first indication information to the network device, and the first indication information is configured to indicate the current interference information of the first frequency band combination.

In 3, the network device receives the first indication information, and executes the configuration operation for the first frequency band combination according to the indicated interference information, such as configuring/not configuring the first frequency band combination.

After the operation in 3, the method for frequency band configuration may further include at least one of the following operations.

In 4-1, the network device periodically sends the first inquiry information to the terminal device, to enable the terminal device to send the first indication information to the network device after receiving the first inquiry information.

In 4-2, the terminal device periodically sends the first indication information to the network device.

In 4-3, in a case that the interference state of the terminal device changes, the terminal device sends the first indication information to the network device.

In 4-4, the network device periodically sends the first inquiry information to the terminal device; and the terminal device periodically sends the first indication information to the network device or sends the first indication information to the network device in a case that the interference state changes.

In the above operations, the first indication information is configured to indicate the current interference information of the first frequency band combination. That is, the terminal device determines the interference information based on the real-time interference situation and sends new first indication information.

In this application example, the interference information reported by the terminal device through the first indication information may include at least one of the following:

the first interference value corresponding to the first frequency band combination;

the interference state corresponding to the first interference value;

the interference area type of the area where the terminal device is located; or the PHR corresponding to the first frequency band combination.

That is, the terminal device may either use the explicit reporting mode or the implicit reporting mode.

Further, the interference information reported by the terminal device may have a correspondence with the interference type. For example, the terminal may report the interference state of the harmonic interference or the intermodulation interference. In a case of configuring the first frequency band combination, the network device determines according to the interference information whether to schedule the time-frequency resource(s) corresponding to the interference type under the first frequency band combination.

This application example uses the dynamic reporting mode, which may accurately implement the configuration operation consistent with the actual interference situation in a case that the interference situation of the terminal device is affected by different positions, transmitted power, usage scenarios and other factors.

The specific setting and implementation modes of the embodiments of the present disclosure are described from different angles through the above multiple embodiments. By using at least an embodiment of the present disclosure, the terminal device reports the interference information of the first frequency band combination by sending the first indication information, and the network device may obtain the interference information of the terminal device, and execute the configuration operation according to the interference information of the terminal device. Therefore, the configuration of the frequency band combination by the network device may be consistent with the actual interference situation of the terminal device, so as to effectively utilize each frequency band combination.

Figure 10:
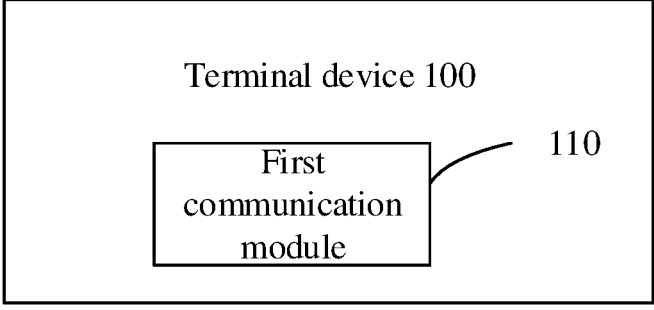
FIG. 10 is a schematic structural block diagram of a terminal device according to an embodiment of the present disclosure.

Corresponding to the processing method of at least one of the above embodiments, the embodiments of the present disclosure also provide a terminal device 100, referring to FIG. 10, which includes a first communication module 110.

The first communication module 110 is configured to send first indication information to a network device.

The first indication information is configured to indicate interference information of a first frequency band combination, and the interference information is configured to indicate the network device to perform a configuration operation for the first frequency band combination.

In an embodiment, the interference information includes a first interference value corresponding to the first frequency band combination and/or an interference state corresponding to the first interference value.

In an embodiment, the first indication information is configured to indicate that the first interference value corresponding to the first frequency band combination is greater than a first preset value.

In an embodiment, the first indication information is configured to indicate that the first interference value corresponding to the first frequency band combination is less than a second preset value.

In an embodiment, the interference information includes an interference area type of an area where the terminal device 100 is located.

Figure 11:
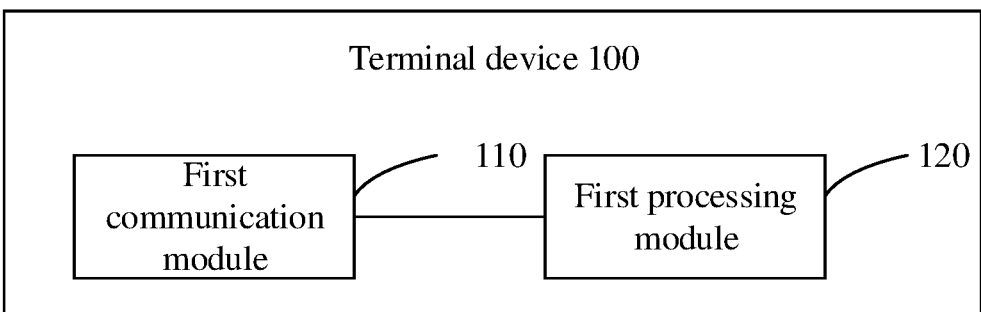
FIG. 11 is a schematic structural block diagram of a terminal device according to another embodiment of the present disclosure.

As illustrated in FIG. 11, the terminal device 100 further includes a first processing module 120.

The first processing module 120 is configured to determine the interference area type of the area where the terminal device 100 is located based on DL signal strength corresponding to the first frequency band combination.

In an embodiment, the interference information includes a PHR corresponding to the first frequency band combination, and the PHR has a correspondence with the interference area type of the area where the terminal device 100 is located.

In an embodiment, the configuration operation for the first frequency band combination includes that: it is determined whether to configure the first frequency band combination for the terminal device 100.

In an embodiment, the interference information has a correspondence with the first interference type.

Correspondingly, the configuration operation for the first frequency band combination includes that: in a case of configuring the first frequency band combination for the terminal device 100, it is determined whether to perform scheduling based on a time-frequency resource corresponding to the first interference type under the first frequency band combination.

In an embodiment, the first interference type includes harmonic interference and/or intermodulation interference.

In an embodiment, the first communication module 110 is configured to send the first indication information to the network device in a process of reporting terminal capability.

In an embodiment, the first indication information includes first RRC signaling.

In an embodiment, the first communication module 110 is configured to perform at least one of the following:

periodically send the first indication information to the network device:

send, in a case of receiving first inquiry information sent by the network device, the first indication information to the network device, the first inquiry information being configured to instruct the terminal device 100 to report the interference information: or send, in a case that the interference state of the terminal device 100 changes, the first indication information to the network device.

In an embodiment, the first indication information includes at least one of the following: second RRC signaling: MAC CE: or physical layer signaling.

The terminal device 100 in the embodiment of the present disclosure may realize the corresponding functions of the terminal device in the method embodiments. The process, function, implementation mode, and beneficial effect corresponding to each module (submodule, unit, component, or the like) in the terminal device 100 may refer to the corresponding descriptions in the method embodiments, and will not be elaborated herein. It is to be noted that the function described with respect to each module (submodule, unit, component, or the like) in the terminal device 100 of the embodiments of the present disclosure may be realized by different modules (submodules, units, components, or the like), or by the same module (submodule, unit, component or the like). For example, a first sending module and a second sending module may be different modules or may be the same module, both of which may realize the corresponding function of the terminal device in the embodiment of the present disclosure. In addition, the communication module in the embodiment of the present disclosure may be implemented by a transceiver of the device, and some or all of the remaining modules may be implemented by a processor of the device.

Figure 12:
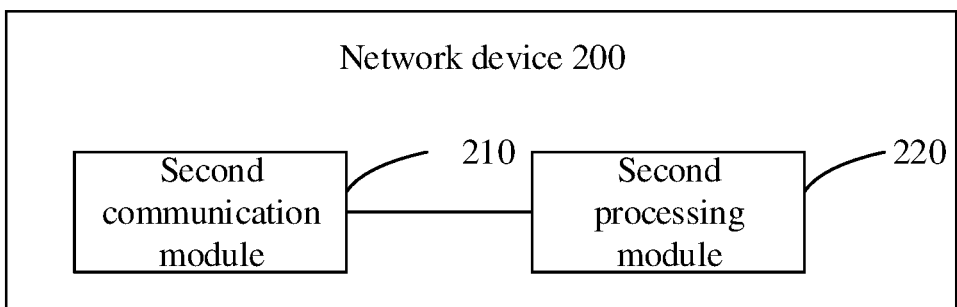
FIG. 12 is a schematic structural block diagram of a network device according to an embodiment of the present disclosure.

FIG. 12 is a schematic block diagram of a network device 200 according to an embodiment of the present disclosure. The network device 200 may include a second communication unit 210 and a second processing module 220.

The second communication module 210 is configured to receive first indication information from a terminal device 210. The first indication information is configured to indicate interference information of a first frequency band combination.

The second processing module 220 is configured to perform a configuration operation for the first frequency band combination according to the interference information.

In an embodiment, the interference information includes at least one of the following:

a first interference value corresponding to the first frequency band combination;

an interference state corresponding to the first interference value;

an interference area type of an area where the terminal device is located; or a PHR corresponding to the first frequency band combination.

In an embodiment, the second processing module 220 is configured to determine whether to configure the first frequency band combination for the terminal device according to the interference information.

In an embodiment, the second processing module 220 is configured to: determine, in response to determining according to the interference information that the first interference value corresponding to the first frequency band combination is greater than a first preset value, not to configure the first frequency band combination for the terminal device; and/or, determine, in response to determining according to the interference information that the first interference value corresponding to the first frequency band combination is less than a second preset value, to configure the first frequency band combination for the terminal device.

In an embodiment, the second processing module 220 is configured to: determine, in response to determining according to the interference information that the area where the terminal device is located is a strong interference area, not to configure the first frequency band combination for the terminal device; and/or, determine, in response to determining according to the interference information that the area where the terminal device is located is a weak interference area, to configure the first frequency band combination for the terminal device.

In an embodiment, the interference information has a correspondence with a first interference type. Correspondingly, the second processing module 220 is configured to, in a case of configuring the first frequency band combination for the terminal device, determine, according to the interference information, whether to perform scheduling based on a time-frequency resource corresponding to the first interference type under the first frequency band combination.

In an embodiment, the second processing module 220 is configured to:

determine, in response to determining according to the interference information that the first interference value of the first interference type corresponding to the first frequency band combination is greater than the first preset value, not to perform scheduling based on the time-frequency resource corresponding to the first interference type under the first frequency band combination; and/or, determine, in response to determining according to the interference information that the first interference value of the first interference type corresponding to the first frequency band combination is less than the second preset value, to perform scheduling based on the time-frequency resource corresponding to the first interference type under the first frequency band combination.

In an embodiment, the second communication module 210 is configured to receive the first indication information sent periodically by the terminal device.

Correspondingly, the second processing module 220 is configured to: perform, in a case of configuring the frequency band combination for the terminal device, the configuration operation for the first frequency band combination according to the interference information indicated by the latest first indication information.

In an embodiment, the second communication module 210 is configured to send first inquiry information to the terminal device, the first inquiry information being configured to instruct the terminal device to report the interference information; and receive the first indication information sent by the terminal device for the first inquiry information.

In an embodiment, the second communication module 210 is configured to send, in a case of configuring the frequency band combination for the terminal device, the first inquiry information to the terminal device; and/or, periodically send the first inquiry information to the terminal device.

In an embodiment, the second communication module 210 is also configured to send second indication information to the terminal device. The second indication information is configured to indicate a frequency band combination configured for the terminal device.

The network device 200 in the embodiment of the present disclosure may realize the corresponding functions of the network device in the method embodiments. The process, function, implementation mode, and beneficial effect corresponding to each module (submodule, unit, component, or the like) in the network device 200 may refer to the corresponding descriptions in the method embodiments, and will not be elaborated herein. It is to be noted that the function described with respect to each module (submodule, unit, component, or the like) in the network device 200 of the embodiment of the present disclosure may be realized by different modules (submodules, units, components, or the like), or by the same module (submodule, unit, component or the like). For example, a first sending module and a second sending module may be different modules or may be the same module, both of which can realize the corresponding function of the network device in the embodiment of the present disclosure. In addition, the communication module in the embodiment of the present disclosure may be implemented by a transceiver of the device, and some or all of the remaining modules may be implemented by a processor of the device.

Figure 13:
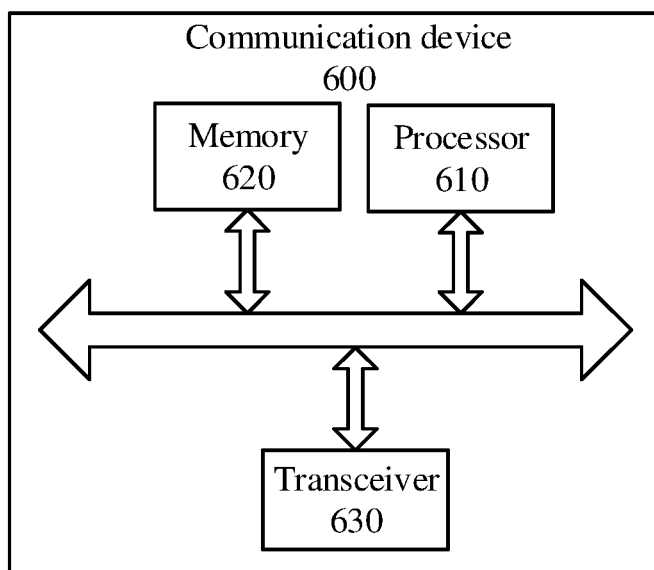
FIG. 13 is a schematic block diagram of a communication device according to an embodiment of the present disclosure.

FIG. 13 is a schematic structural diagram of a communication device 600 according to an embodiment of the present disclosure. The communication device 600 includes a processor 610. The processor 610 may call and run a computer program from a memory to implement the method in the embodiments of the present disclosure.

In an embodiment, the communication device 600 may further include a memory 620. The processor 610 may call and run the computer program from the memory 620 to implement the method in the embodiments of the present disclosure.

The memory 620 may be a separate device from the processor 610, or may be integrated in the processor 610.

In an embodiment, the communication device 600 may further include a transceiver 630, and the processor 610 may control the transceiver 630 to communicate with another device, specifically to send information or data to another device or receive information or data sent by another device.

The transceiver 630 may include a transmitter and a receiver. The transceiver 630 may further include an antenna, and the number of antennas may be one or more.

In an embodiment, the communication device 600 may be the network device of the embodiments of the present disclosure. The communication device 600 may implement corresponding flows implemented by the network device in each method of the embodiments of the present disclosure. For brevity, elaborations are omitted herein.

In an embodiment, the communication device 600 may be the terminal device of the embodiments of the present disclosure. The communication device 600 may implement corresponding flows implemented by the terminal device in each method of the embodiments of the present disclosure. For brevity, elaborations are omitted herein.

Figure 14:
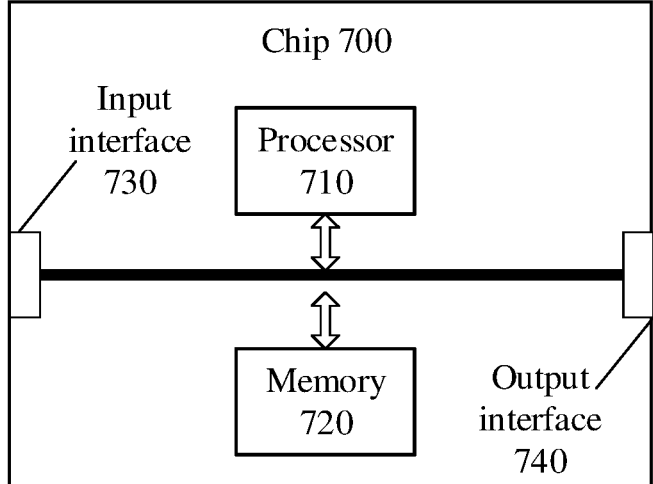
FIG. 14 is a schematic block diagram of a chip according to an embodiment of the present disclosure.

FIG. 14 is a schematic structural diagram of a chip 700 according to an embodiment of the present disclosure. The chip 700 includes a processor 710. The processor 710 may call and run a computer program from a memory to implement the method in the embodiments of the present disclosure.

In an embodiment, the chip 700 may further include a memory 720. The processor 710 may call and run the computer program from the memory 720 to implement the method in the embodiments of the present disclosure.

The memory 720 may be a separate device from the processor 710, or may be integrated in the processor 710.

In an embodiment, the chip 700 may further include an input interface 730. The processor 710 may control the input interface 730 to communicate with other devices or chips, and specifically, may acquire information or data sent by other devices or chips.

In an embodiment, the chip 700 may further include an output interface 740. The processor 710 may control the output interface 740 to communicate with other devices or chips, and specifically, may output information or data to other devices or chips.

In an embodiment, the chip may be applied to the network device of the embodiments of the present disclosure. The chip may implement corresponding flows implemented by the network device in each method of the embodiments of the present disclosure. For brevity, elaborations are omitted herein.

In an embodiment, the chip may be applied to the terminal device of the embodiments of the present disclosure. The chip may implement corresponding flows implemented by the terminal device in each method of the embodiments of the present disclosure. For brevity, elaborations are omitted herein.

It is to be understood that the chip in the embodiments of the present disclosure may also be called a system-level chip, a system chip, a chip system, a system on chip, or the like.

The processor mentioned above may be a general-purpose processor, a Digital Signal Processor (DSP), a Field Programmable Gate Array (FPGA), an Application Specific Integrated Circuit (ASIC), or another programmable logical device, transistor logical device, discrete hardware component, etc. The general-purpose processor mentioned above may be a microprocessor, or any conventional processor, etc.

The memory mentioned above may be a volatile memory or a nonvolatile memory, or may include both volatile and nonvolatile memories. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It is to be understood that the memory is exemplarily but unlimitedly described. For example, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). That is, the memory in the embodiments of the present disclosure is intended to include, but not limited to, memories of these and any other proper types.

Figure 15:
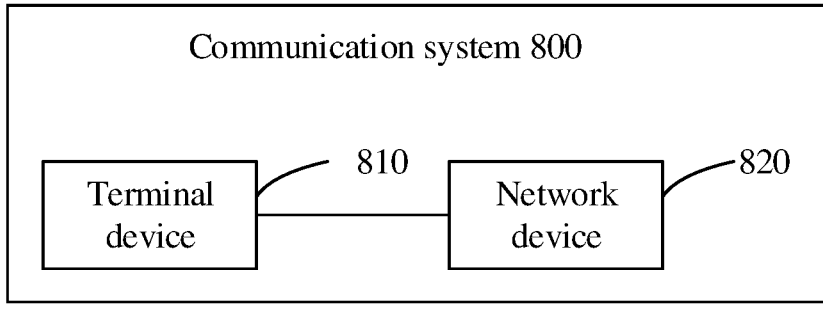
FIG. 15 is a schematic block diagram of a communication system according to an embodiment of the present disclosure.

FIG. 15 is a schematic block diagram of a communication system 800 according to an embodiment of the present disclosure. The communication system 800 includes a terminal device 810 and a network device 820.

The terminal device 810 sends first indication information to the network device 820, where the first indication information is configured to indicate interference information of a first frequency band combination. The network device 820 receives the first indication information from the terminal device 810 and executes a configuration operation for the first frequency band combination according to the interference information indicated by the first indication information.

The terminal device 810 may be configured to realize the corresponding functions realized by the terminal device in the method of various embodiments of the present disclosure, and the network device 820 may be configured to realize the corresponding functions realized by the network device in the method of various embodiments of the present disclosure. For brevity, elaborations are omitted herein.

The embodiments may be implemented completely or partially through software, hardware, firmware or any combination thereof. During implementation with the software, the embodiments may be implemented completely or partially in form of a computer program product. The computer program product includes one or more computer instructions. When the computer program instruction is loaded and executed on a computer, the flows or functions according to the embodiments of the present disclosure are completely or partially generated. The computer may be a universal computer, a dedicated computer, a computer network, or another programmable device. The computer instruction may be stored in a computer-readable storage medium or transmitted from a computer-readable storage medium to another computer-readable storage medium. For example, the computer instruction may be transmitted from a website, computer, server, or data center to another website, computer, server, or data center in a wired (such as coaxial cable, optical fiber, and Digital Subscriber Line (DSL)) or wireless (such as infrared, radio, and microwave) manner. The computer-readable storage medium may be any available medium accessible for the computer or a data storage device integrated with one or more available media, such as a server and a data center. The available medium may be a magnetic medium (for example, a floppy disk, a hard disk and a magnetic tape), an optical medium (for example, a Digital Video Disk (DVD)), a semiconductor medium (for example, a Solid State Disk (SSD)), or the like.

It is to be understood that a magnitude of a sequence number of each process does not mean an execution sequence and the execution sequence of each process should be determined by its function and an internal logic and should not form any limit to an implementation process of the embodiments of the disclosure.

Those skilled in the art may clearly learn about that specific working processes of the system, device, and unit described above may refer to the corresponding processes in the method embodiments and will not be elaborated herein for ease and briefness of description.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subjected to the scope of protection of the claims.

The invention claimed is:

1. A method for frequency band configuration, comprising:

sending, by a terminal device, first indication information to a network device;

wherein the first indication information is used to indicate interference information of a first frequency band combination, and the interference information is used to indicate the network device to perform a configuration operation for the first frequency band combination;

wherein the interference information has a correspondence with a first interference type, the first interference type comprises at least one of harmonic interference or intermodulation interference, and the configuration operation for the first frequency band combination comprises:

in response to the first frequency band combination being configured for the terminal device, determining whether to perform scheduling based on a time-frequency resource corresponding to the first interference type under the first frequency band combination.

2. The method of claim 1, wherein the interference information comprises at least one of a first interference value corresponding to the first frequency band combination or an interference state corresponding to the first interference value.

3. The method of claim 1, wherein the first indication information is used to indicate that a first interference value corresponding to the first frequency band combination is greater than a first preset value.

4. The method of claim 1, wherein the first indication information is used to indicate that a first interference value corresponding to the first frequency band combination is less than a second preset value.

5. The method of claim 1, wherein the configuration operation for the first frequency band combination comprises: determining whether to configure the first frequency band combination for the terminal device.

6. The method of claim 1, wherein sending, by the terminal device, the first indication information to the network device comprises:

sending, by the terminal device, the first indication information to the network device in a process of reporting terminal capability.

7. The method of claim 1, wherein sending, by the terminal device, the first indication information to the network device comprises at least one of:

periodically sending, by the terminal device, the first indication information to the network device;

sending, by the terminal device, the first indication information to the network device in response to receiving first inquiry information sent by the network device, wherein the first inquiry information is used to instruct the terminal device to report the interference information; or sending, by the terminal device, the first indication information to the network device in response to an interference state of the terminal device changing.

8. A terminal device, comprising:

a first transceiver, configured to send first indication information to a network device;

wherein the first indication information is used to indicate interference information of a first frequency band combination, and the interference information is used to indicate the network device to perform a configuration operation for the first frequency band combination;

wherein the interference information has a correspondence with a first interference type, the first interference type comprises at least one of harmonic interference or intermodulation interference, and the configuration operation for the first frequency band combination comprises:

in response to the first frequency band combination being configured for the terminal device, determining whether to perform scheduling based on a time-frequency resource corresponding to the first interference type under the first frequency band combination.

9. The terminal device of claim 8, wherein the interference information comprises at least one of a first interference value corresponding to the first frequency band combination or an interference state corresponding to the first interference value.

10. The terminal device of claim 8, wherein the first indication information is used to indicate that a first interference value corresponding to the first frequency band combination is greater than a first preset value.

11. The terminal device of claim 8, wherein the first indication information is used to indicate that a first interference value corresponding to the first frequency band combination is less than a second preset value.

12. The terminal device of claim 8, wherein the configuration operation for the first frequency band combination comprises: determining whether to configure the first frequency band combination for the terminal device.

13. The terminal device of claim 8, wherein the first transceiver is configured to:

send the first indication information to the network device in a process of reporting terminal capability.

14. The terminal device of claim 8, wherein the first transceiver is configured to perform at least one of:

periodical sending of the first indication information to the network device;

sending of the first indication information to the network device in response to receiving first inquiry information sent by the network device, wherein the first inquiry information is used to instruct the terminal device to report the interference information; and sending of the first indication information to the network device in response to an interference state of the terminal device changing.

15. A network device, comprising:

a second transceiver, configured to receive first indication information from a terminal device, wherein the first indication information is used to indicate interference information of a first frequency band combination; and a second processor, configured to perform a configuration operation for the first frequency band combination according to the interference information;

wherein the interference information has a correspondence with a first interference type, the first interference type comprises at least one of harmonic interference or intermodulation interference, and the second processor is configured to:

in response to the first frequency band combination being configured for the terminal device, determine whether to perform scheduling based on a time-frequency resource corresponding to the first interference type under the first frequency band combination.

16. The network device of claim 15, wherein the interference information comprises at least one of:

a first interference value corresponding to the first frequency band combination;

an interference state corresponding to the first interference value;

an interference area type of an area where the terminal device is located; or a Power Head Room (PHR) corresponding to the first frequency band combination.

17. The network device of claim 15, wherein the second processor is configured to:

determine whether to configure the first frequency band combination for the terminal device according to the interference information.

* * * * *